United States Patent
Tseytlin

(10) Patent No.: US 10,681,323 B2
(45) Date of Patent: *Jun. 9, 2020

(54) METHODS, SYSTEMS, AND MEDIA FOR GENERATING A SUMMARIZED VIDEO USING FRAME RATE MODIFICATION

(71) Applicant: Google LLC, Mountain View, CA (US)

(72) Inventor: Yan Tseytlin, Wayne, NJ (US)

(73) Assignee: Google LLC, Mountain View, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/676,669

(22) Filed: Aug. 14, 2017

(65) Prior Publication Data
US 2017/0347082 A1 Nov. 30, 2017

Related U.S. Application Data

(63) Continuation of application No. 13/834,021, filed on Mar. 15, 2013, now Pat. No. 9,736,448.

(51) Int. Cl.
| | | |
|---|---|---|
| *H04N 9/87* | (2006.01) | |
| *H04N 9/804* | (2006.01) | |
| *H04N 5/765* | (2006.01) | |
| *H04N 5/783* | (2006.01) | |
| *G11B 27/034* | (2006.01) | |
| *G11B 27/036* | (2006.01) | |

(52) U.S. Cl.
CPC ............ *H04N 9/87* (2013.01); *G11B 27/034* (2013.01); *G11B 27/036* (2013.01); *H04N 5/765* (2013.01); *H04N 5/783* (2013.01); *H04N 9/8042* (2013.01)

(58) Field of Classification Search
CPC .......... H04N 9/87; H04N 5/765; H04N 5/783; H04N 9/8042; G11B 27/00

USPC ......................................................... 386/273
See application file for complete search history.

(56) References Cited

U.S. PATENT DOCUMENTS

| | | | |
|---|---|---|---|
| 2002/0018640 A1 | 2/2002 | Bolduc | |
| 2003/0016750 A1* | 1/2003 | Cok | ....................... H04N 5/915 375/240.16 |
| 2003/0031461 A1 | 2/2003 | Takayama | |

(Continued)

OTHER PUBLICATIONS

"Distributed Checksum Clearinghouse," Wikipedia, last modified Mar. 14, 2013, pp. 1-2, available at http://en.wikipedia.org/wiki/Distributed_Checksum_Clearinghouse.

(Continued)

*Primary Examiner* — Thai Q Tran
*Assistant Examiner* — Nienru Yang
(74) *Attorney, Agent, or Firm* — Byrne Poh LLP

(57) ABSTRACT

Methods, systems, and media for generating a summarized video using frame rate modification are provided. In some embodiments, a method for editing a video is provided, the method comprising: receiving, using a hardware processor, a video file; identifying a plurality of frames at a playback frame rate from the video file; generating an edited video file by extracting a subset of the plurality of frames, wherein the extracted frames in the subset of the plurality of frames are separated by a predetermined length in the plurality of frames and wherein extracting the subset of the plurality frames modifies a frame rate of at least a portion of the video file to an effective frame rate; storing the edited video file; and presenting the edited video file at the playback frame rate.

21 Claims, 5 Drawing Sheets

(56) References Cited

U.S. PATENT DOCUMENTS

| | | | |
|---|---|---|---|
| 2003/0055844 A1* | 3/2003 | Rudd | H04N 1/00212 |
| 2009/0300676 A1* | 12/2009 | Harter, Jr. | H04N 5/782 725/35 |
| 2010/0231763 A1 | 9/2010 | Deschamp et al. | |
| 2011/0116772 A1 | 5/2011 | Kwon et al. | |
| 2012/0251083 A1 | 10/2012 | Svendsen et al. | |
| 2012/0281971 A1 | 11/2012 | Lin | |
| 2013/0198788 A1 | 8/2013 | Barger et al. | |

OTHER PUBLICATIONS

"Spam Assassin," Wikipedia, last modified Dec. 1, 2014, pp. 1-5, available at http://en.wikipedia.org/wiki/SpamAssassin.
Office Action dated Jan. 4, 2016 in U.S. Appl. No. 13/834,021.
Office Action dated May 19, 2016 in U.S. Appl. No. 13/834,021.
Office Action dated May 21, 2015 in U.S. Appl. No. 13/834,021.
Office Action dated Oct. 2, 2014 in U.S. Appl. No. 13/834,021.

* cited by examiner

METHODS, SYSTEMS, AND MEDIA FOR GENERATING A SUMMARIZED VIDEO USING FRAME RATE MODIFICATION

CROSS-REFERENCE TO RELATED APPLICATION

This application is a continuation of U.S. patent application Ser. No. 13/834,021, filed Mar. 15, 2013, which is hereby incorporated by reference herein in its entirety.

TECHNICAL FIELD

The disclosed subject matter relates to methods, systems, and media for generating a summarized video using frame rate modification.

BACKGROUND

Capturing a video can ensure that a certain moment is not missed. As the number of devices having video capturing capabilities increases (e.g., mobile telephones, smart phones, personal digital assistants, digital cameras, portable media players, etc.), an individual using one of these devices is generally able to capture that certain moment. Moreover, an individual tends to record a large amount of video when attending events, participating in activities, going on vacation, or the like. Such an individual often wants to share an interesting video with friends, family, and/or the public at large.

However, difficulties often arise when the individual wants to pick and choose the more interesting parts of the video that was recorded to be shared with others. In addition, the process of video editing can be extremely time consuming and difficult to master. For the amateur videographer, it can be frustrating to attempt to determine which parts of a lengthy video are the most interesting.

Accordingly, it is desirable to provide methods, systems, and media for editing a frame rate of a received video to create a summarized video are provided.

SUMMARY

In accordance with various embodiments of the disclosed subject matter, methods, systems, and media for generating a summarized video using frame rate modification are provided.

In accordance with some embodiments of the disclosed subject matter, a method for editing a video is provided, the method comprising: receiving, using a hardware processor, a video file; identifying a plurality of frames at a playback frame rate from the video file; generating an edited video file by extracting a subset of the plurality of frames, wherein the extracted frames in the subset of the plurality of frames are separated by a predetermined length in the plurality of frames and wherein extracting the subset of the plurality frames modifies a frame rate of at least a portion of the video file to an effective frame rate; storing the edited video file; and presenting the edited video file at the playback frame rate.

In accordance with some embodiments of the disclosed subject matter, a system for editing a video is provided. The system comprises a hardware processor that is configured to: receive a video file; identify a plurality of frames at a playback frame rate from the video file; generate an edited video file by extracting a subset of the plurality of frames, wherein the extracted frames in the subset of the plurality of frames are separated by a predetermined length in the plurality of frames and wherein extracting the subset of the plurality frames modifies a frame rate of at least a portion of the video file to an effective frame rate; store the edited video file; and present the edited video file at the playback frame rate.

In accordance with some embodiments of the disclosed subject matter, a non-transitory computer-readable medium containing computer executable instructions that, when executed by a processor, cause the processor to perform a method for editing a video is provided. The method comprises: receiving a video file; identifying a plurality of frames at a playback frame rate from the video file; generating an edited video file by extracting a subset of the plurality of frames, wherein the extracted frames in the subset of the plurality of frames are separated by a predetermined length in the plurality of frames and wherein extracting the subset of the plurality frames modifies a frame rate of at least a portion of the video file to an effective frame rate; storing the edited video file; and presenting the edited video file at the playback frame rate.

In accordance with some embodiments of the disclosed subject matter, a system for editing a video is provided. The system comprises: means for receiving a video file; means for identifying a plurality of frames at a playback frame rate from the video file; means for generating an edited video file by extracting a subset of the plurality of frames, wherein the extracted frames in the subset of the plurality of frames are separated by a predetermined length in the plurality of frames and wherein extracting the subset of the plurality frames modifies a frame rate of at least a portion of the video file to an effective frame rate; means for storing the edited video file; and means for presenting the edited video file at the playback frame rate.

In accordance with some embodiments, the video file contains user-recorded video content.

In some embodiments, the system further comprises means for including the subset of the plurality of frames in the edited video file.

In some embodiments, the system further comprises means for removing the subset of the plurality of frames from the edited video file.

In some embodiments, the system further comprises: means for storing the received video file, wherein the edited video file is associated with the received video file; means for receiving a request to present the received video file while presenting a portion of the edited video file that corresponds to the selected subset of the plurality of frames; and means for presenting a portion of the received video file that corresponds to the extracted subset of the plurality of frames in response to receiving the request to present the received video file.

In some embodiments, the system further comprises means for determining which of the subset of the plurality of frames to extract to generate the edited video at the effective frame rate, wherein the determination is based on at least one of a size of the received video file, a length of video content in the received video file, a user-indicated effective frame rate, the playback frame rate, and an effective frame rate based on a tempo of audio selected by a user.

In some embodiments, the system further comprises: means for receiving a selection of the portion of the plurality of identified frames; and means for modifying a frame rate associated with the portion of the plurality of identified frames to the effective frame rate by extracting one or more frames from the portion of the plurality of identified frames, wherein the one or more frames are separated by the predetermined length.

In some embodiments, the system further comprises: means for identifying an acceptable file size for the received video file; means for determining whether a size of the received video file exceeds the acceptable file size; and means for prompting a user to generate the edited video file by modifying the frame rate of the video file to the effective frame rate by extracting the subset of the plurality of frames in response to determining that the size of the received video file exceeds the acceptable file size.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
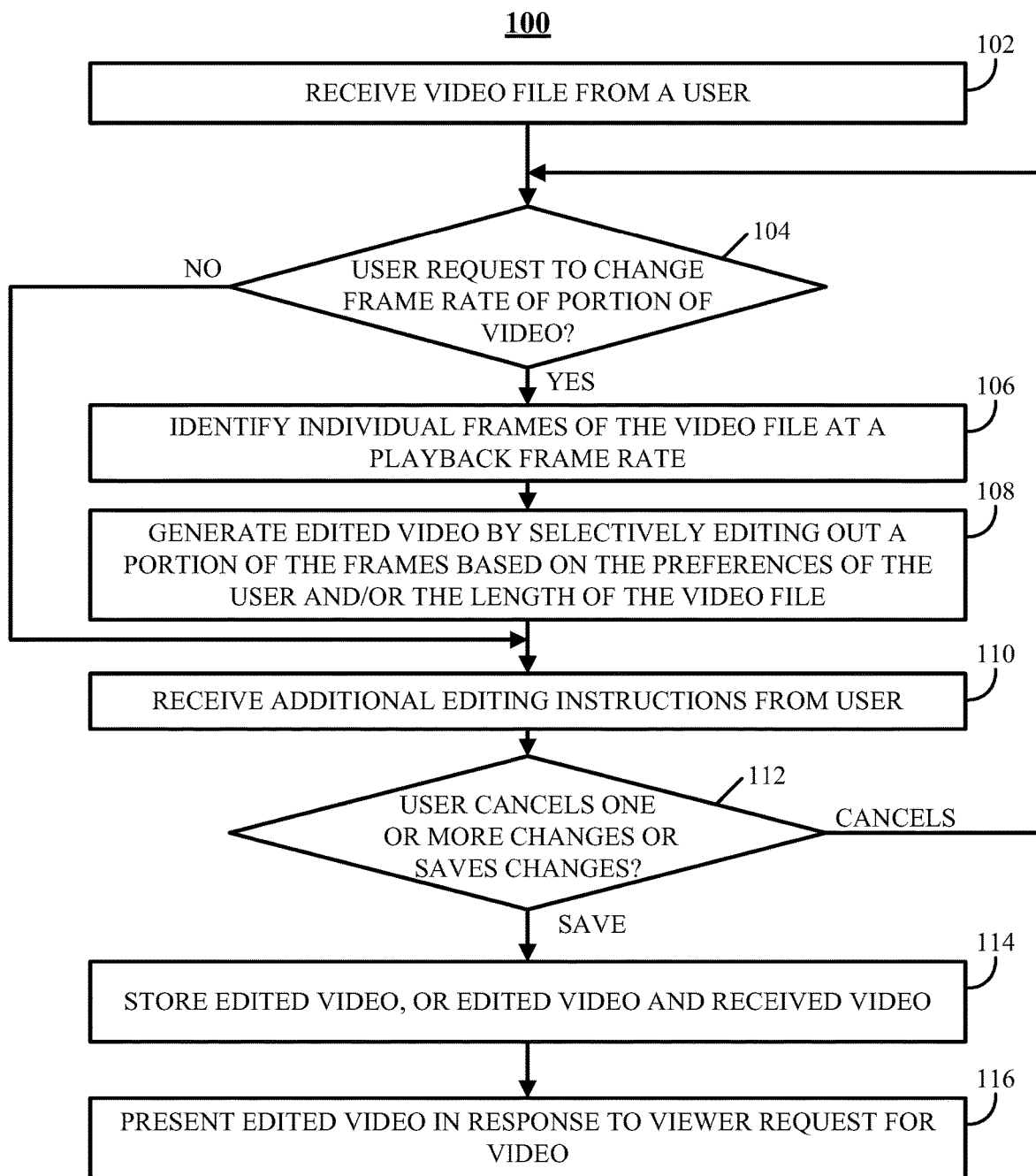
FIG. 1 shows an example of a process for editing a frame rate of a received video to create a summarized video in accordance with some embodiments of the disclosed subject matter.

In accordance with various embodiments, mechanisms (which include methods, systems, and media) for generating a summarized video using frame rate modification are provided.

Generally speaking, when a user wants to share a video that the user recorded, the user can upload the video to a video sharing service or a content hosting service. Other users can access the video by using a search function (e.g., inputting one or more search terms and the video is provided as one of the search results responsive to the search terms), by selecting a link to a particular video, or the like.

It should be noted that the video provided by the user can be a video file of any suitable format, including but not limited to, any Motion Picture Experts Group (MPEG) format, H.264, QuickTime format, Audio Video Interleave (AVI) format, Windows Media Video (WMV) format, Flash Video (FLV) format, etc. It should be noted that a recorded video file can include any suitable amount of video, from a few minutes to many hours. For example, the video file can include a video sequence from a single event, such as the user's children playing in the backyard, to video sequences from several events, such as visits to different landmarks while sightseeing.

In response to determining that the user has uploaded a video file to a video sharing service and/or a content hosting service, these mechanisms can provide the user with an opportunity to edit the video. For example, the mechanisms can provide the user with an option to automatically create a summarized version of the uploaded video file for sharing on the video sharing service. In another example, the mechanism can present the uploaded video file in a video editing application that is connected to the video sharing service. Such a video editing application can include tools for creating a summarized version of the video for sharing on the video sharing service.

In some embodiments, the mechanisms can extract individual frames from the uploaded video file and create a summarized version of the video by selectively removing some of the frames from the video and retaining others. For example, a video file that was originally captured at a frame rate of thirty frames per second and that has two-thirds of the frames removed (e.g., two of every three frames can be dropped from the video) can be similar to the same video as if it were captured at a frame rate of ten frames per second. When the summarized video is played back at the frame rate at which the video was originally captured (e.g., thirty frames per second), the summarized video moves through the action at a quicker pace. It should be noted that, in some embodiments, the summarized video can have the appearance of a video that is played in fast forward, the appearance of a stop-motion video, or the appearance of a video that is skipping ahead periodically. This is sometimes referred to herein as an effective frame rate of the summarized video.

In some embodiments, the mechanisms can allow the summarized video to be further edited by, for example, adding audio (e.g., a soundtrack), adding effects, adding annotations, or any other suitable editing.

In some embodiments, the summarized and/or edited video can be stored using the video sharing service and can be made available for presentation to viewers of the video. Additionally, the unedited video (e.g., the video as uploaded by the user) can be stored in association with the summarized video at the user's discretion, as some viewers may be interested in viewing all or part of the video at the original frame rate, even if the user that uploaded the video thought portions of the video may be uninteresting to viewers.

These mechanisms can be used in a variety of applications. For example, these mechanisms can provide a video editing filter that provides users with the ability to create a summarized video in the form of a stop motion video. In another example, these mechanisms can allow a user to provide a substantial amount of video content and automatically create a summarized video that is appealing and engaging to viewers.

Turning to FIG. 1, an example 100 of a process for generating a summarized video using frame rate modification is shown in accordance with some embodiments of the disclosed subject matter. At 102, an editing application can receive a video file from a user. The received video file can be received from any suitable source. For example, in some embodiments, the video file can be uploaded to an online video editor from a user device (e.g., a personal computer, a laptop computer, a mobile telephone, a smartphone, a smartphone having a camera, a tablet computer, a camera device, a portable media player, a wearable computer, etc.). In another example, the video file can be retrieved from a storage device coupled to a device that is executing the editing application. In yet another example, the video file can be received via an email or a text message.

In some embodiments, the received video file can be in a digital file format (e.g., the video file can be saved in a particular file format), a digital stream of data (e.g., the video file can be received as a bitstream of video content), as a stream of data representing analog video data (e.g., video data can be received from an analog device, such as a videocassette recorder (VCR)), etc. Additionally, the video file can include audio data, video metadata, and/or any other data or information suitable for inclusion with a video file.

In some embodiments, video data in the video file can be recorded at any suitable resolution, aspect ratio, and frame rate. For example, in some embodiments, the video data in the video file can be SVGA video, High Definition (HD) video, Full HD video, etc. Additionally, the video data in the video file can be at any suitable frame rate (e.g., 24 frames per second (FPS), 30 FPS, 48 FPS, 60 FPS, etc.) and can be recorded in either progressive scan or interlace scan formats.

As mentioned above, the video file can be encoded in any suitable format, including but not limited to, any Motion Picture Experts Group (MPEG) format, H.264, QuickTime format, Audio Video Interleave (AVI) format, Windows Media Video (WMV) format, Flash Video (FLV) format, or any other suitable compression format. In another example, the video data can be encoded in a file or streamed as uncompressed (or raw) video data.

In some embodiments, the editing application can be configured to accept video files in particular formats, and can require a user to convert the video into an acceptable format. Additionally or alternatively, the editing application can convert video that is in an unacceptable format to a video that is in an acceptable format. It should be noted that the video file, video data, and any other data or information associated with the video are sometimes referred to herein as the video.

At 104, the editing application can determine whether the user has requested a reduction in the frame rate of at least a portion of the video. A user request to reduce the frame rate of the video can be received in any suitable form. For example, the editing application can receive an indication that a user has selected an option in a user interface to reduce the frame rate of at least a portion of the video. In another example, in response to uploading a video, the editing application can prompt the user to select whether to reduce the frame of the video upon uploading (e.g., the frame rate of the video is reduced by removing particular frames as the editing application receives the video). In yet another example, the editing application can allow the user to set user preferences that automatically reduce the frame rate of videos associated with the user. In a further example, a video sharing service can provide alternate paths to upload videos and the frame rate can be automatically reduced for videos uploaded using a particular path (e.g., a video sharing service can receive videos at different Internet Protocol (IP) addresses or ports, and, at one of the addresses or ports, the frame rate of the video is automatically reduced).

In some embodiments, the editing application can provide the user with an opportunity to modify the frame rate of a portion of the video file based on features of the video file. For example, the editing application can trigger the frame rate modification features in response to determining that the video file has a length greater than fifteen minutes. In this example, the editing application can prompt the user to automatically reduce the frame rate of the video file or inhibit the user from uploading and/or storing the video file. In another example, the editing application can trigger the frame rate modification features in response to determining the amount of storage allocated to the user. In this example, in response to determining that the user has exceeded a storage limit, the editing application can request that the user reduce the frame rate of the video file.

If the editing application determines that a user has requested that the frame rate of at least a portion of the uploaded video be reduced ("YES" at 104), process 100 can proceed to 106. At 106, the editing application can identify individual frames of the video file at a first frame rate. These individual frames can be identified using any suitable techniques. For example, in some embodiments, each individual frame from the video can be extracted from the video data received at 102 and indexed. In some embodiments, this can require converting the video data and/or decompressing the video data into a format where data for each frame can be rendered meaningfully if the frames are separated. For example, in some compression formats such as MPEG, different frames may be encoded using information from surrounding frames. Some frames may contain information referencing frames before and/or after the frame in order to exploit redundancy in the video (e.g., the compression can rely on the fact that a significant portion of content in video stays consistent from frame to frame). In such an example, frames that contain incomplete information (e.g., rely on information in other frames) may need to be reconstructed as frames that contain all the information to be rendered as though the frame were an individual image, before frames of the video can be removed. Alternatively, if the frame rate of the received video is reduced by dropping certain frames, as described below, the information from the frames that were dropped can be preserved and these frames can simply be skipped during playback.

In another suitable example, if the received video is received in an interlaced format (e.g., each frame is composed of two fields such as an odd field and an even field), the fields that make up a single frame can be combined to create a single frame prior to reducing the frame rate. This can result in a video that was recorded at 60 frames per second in an interlaced format being reduced to 30 frames per second in a progressive scan format. Alternatively, if the received video is received in an interlaced format, the fields that make up a single frame can be indexed as both being part of the same frame and the editing application can prevent the fields from being dropped from the video separately. It should be noted that the frame rate of the received video can be determined using any suitable techniques.

In some embodiments, the editing application can create an indexed list of all the individual frames of the video and can enable editing operations to be performed on individual frames of the video, which editing operations can be tracked on a per frame level. For example, as described below, individual frames can be dropped, rotated, filtered using image filters, zoomed in, zoomed out, etc.

In some embodiments, the editing application can create a copy of the received video file and perform editing operations on the copy of the video file. In such embodiments, the received video (e.g., the unedited video) can be stored until the edited video file is finalized, and/or can be stored in addition to the edited video file at the discretion of the user. It should be noted that, as used herein, the term unedited video generally refers to the video received at 102, and it is recognized that the video received at 102 may have previously been edited in various ways prior to the video being received at 102.

At 108, the editing application can generate an edited video file by selectively editing out a portion of the frames from the frames identified at 106. For example, frames from a video that was recorded at a first frame rate (e.g., 30 FPS) can be removed from at least a portion of the video such that the edited video is effectively the same video as though it were recorded at a second, lower frame rate (e.g., 10 FPS). As mentioned above, this is sometimes referred to herein as an effective frame rate of the edited video. When played back at the first frame rate, the edited portion of the video can appear to be playing back at a faster speed (e.g., what would take sixty seconds to play back in the original video will take twenty seconds to play back in the edited video). It should be noted that the edited video can be played back at any suitable frame rate.

In some embodiments, the edited video can be generated using any suitable techniques. For example, in some embodiments, the edited video can be generated from the unedited video (or a copy of the unedited video) by selectively deleting certain frames and then re-encoding the video using the remaining frames. In a more particular example, the editing application can remove every nth frame from at least a portion of the frames in the received video. As another example, the edited video can be generated from the unedited video by copying frames that are not selected to be edited out (e.g., by copying the selected frames) and creating a new video using the copied frames. It should be noted that the edited video with a reduced frame rate is sometimes referred to herein as a summarized video.

In some embodiments, frames can be selected to be removed from the video using any suitable techniques. For example, frames can selected for removal from the video so that a frame rate of the summarized video is a fixed proportion (e.g., three-fourths, one-half, one-third, one-quarter, etc.) of the frame rate of the received video. In another example, frames can be selected for removal from the video based on a position within the video (e.g., frames can be removed from portions of the video selected by a user). In yet another example, frames can be selected for removal from the video based on the length of the video (e.g., more frames can be selected for removal from longer videos than from shorter videos). In a further example, a user can select a particular frame rate or a particular level of summarization for the video and frames can be selected for removal based on the received user selection.

Figure 2A:
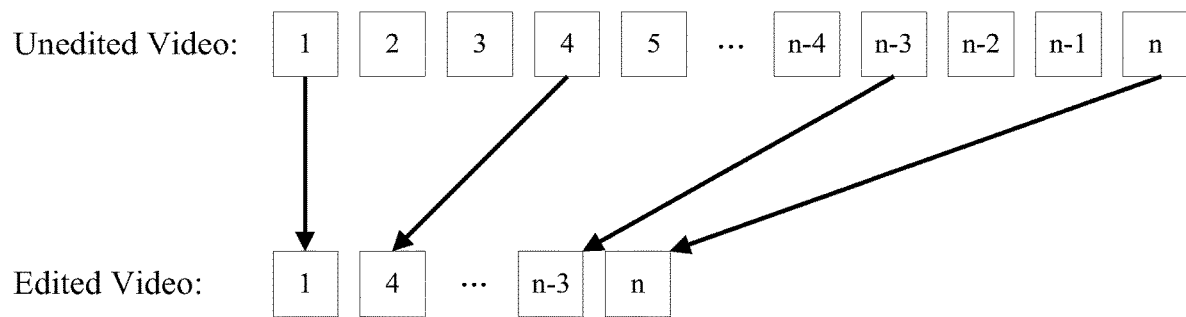
FIGS. 2A and 2B show examples of videos comprised of frames before and after editing in accordance with some embodiments of the disclosed subject matter.

In some embodiments, a video can be summarized in a uniform manner so that the video is shortened but, upon playback, gaps in the video due to frames being removed are distributed evenly. FIG. 2A shows an illustrative example where two out of every three frames of a video are selected for removal. In the example shown in FIG. 2A, individual frames (e.g., frames 1, 2, . . . , n–1, and n) have been identified in the received video, and every third frame (e.g., frames 1, 4, n–2, and n) is selected to be used to generate the summarized video. In this example, if the received video was recorded at thirty frames per second, the summarized video is essentially the same video as though it were recorded at ten frames per second. That is, the summarized video can have an effective frame rate of ten frames per second. If the summarized video is played back to a viewer at the frame rate of the unedited video (e.g., thirty frames per second), motion in the video may appear to the viewer as though it is being played in fast forward, or the like.

Figure 2B:
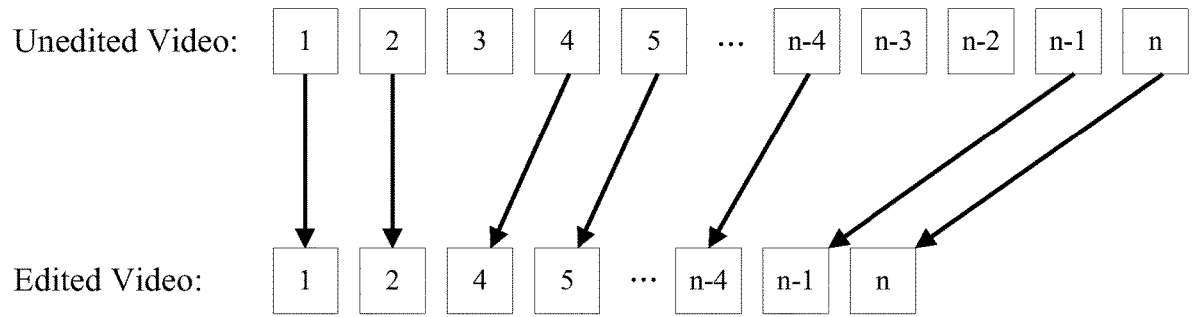

FIG. 2B shows an illustrative example where one of every three frames of a video are selected for removal (e.g., two of every three frames are selected to be used in the summarized video). In the example of FIG. 2B, if the received video was recorded at thirty frames per second, the summarized video is essentially the same video as though it were recorded at twenty frames per second (e.g., the summarized video has an effective frame rate of twenty frames per second). If the summarized video is played back to a viewer at the frame rate of the received video (e.g., thirty frames per second), motion in the video may appear to the viewer to skip at regular intervals. It should be noted that frames can be selected for removal using any suitable pattern (e.g., keep three frames and drop two frames, keep five frames drop ten frames, etc.), changing patterns (e.g., the pattern used to select frames can change over time, and/or the frame rate can change over time), no pattern (e.g., frames can be selected for removal at random intervals), or any suitable combination thereof.

In some embodiments, a target frame rate for a portion of a video can be based on the content of the video. For example, the number of frames selected for removal from a portion of video can be based on the amount of change (e.g., movement perceived in the video) in a particular portion of video. In a more particular example, a target frame rate for portions of a video that exhibit little or no movement can be lower than for portions that exhibit more movement. In this example, portions of a video with little or no movement can appear to have been recorded at a lower frame rate, and when played back at the frame rate of the received video can play back more quickly (e.g., in less time) than the portion with more movement.

In some embodiments, the frames that are selected to be edited out of the video file can be based on user preferences. For example, a user interface can allow the user to select a target frame rate by selecting a numerical value for the target frame rate or by selecting the target frame rate as a fraction of the frame rate of the received video. Such a user interface can allow a user to choose the target frame rate by, for example, entering a positive integer (or real number), entering a multiplier to use to derive the target frame rate from the received video frame rate, using radio buttons to select a target frame rate, using a drop down menu, using a slider interface, etc. In another example, a user interface can allow the user to select a qualitative level of summarization to apply to the received video to generate the summarized video. More particularly, a user can use radio buttons, a drop down menu, a text field, a slider, etc., to select whether the level of summarization should be low, medium, high, etc. These qualitative labels can be associated with fractions of the original frame rates, or the like, which can then be used by the editing application to select a target frame rate for the summarized video.

In some embodiments, the frames that are selected to be removed from the video file can be based on a length of the video. For example, the editing application can use a lower target frame rate for a longer video than the target frame rate for a shorter video. This can allow particularly long videos (e.g., videos with a run time longer than fifteen minutes) to be summarized to a greater extent than shorter videos (e.g., videos with a run time shorter than fifteen minutes).

In some embodiments, the editing application can provide a user with an opportunity to select a portion or portions of the received video to summarize by reducing the frame rate. The other unselected portions of the received video can be maintained at the frame rate at which the received video was recorded. Additionally, in some embodiments, the editing application can provide a user with an opportunity to select different target frame rates for different portions of an unedited video. For example, if a user captures video of an event, such as a graduation ceremony, the user can select to summarize portions of the graduation ceremony that are less interesting. In this example, the user can select to summarize one portion (e.g., the graduates filing in to the auditorium) at a lower target frame rate than another portion (e.g., the graduates receiving their diplomas). The user can also choose to leave certain portions of the received video at the original frame rate (e.g., the commencement address, a portion where the user's daughter's name was announced and she received her diploma, etc.).

In some embodiments, the user can specify audio (e.g., a song) to be used as a soundtrack for the edited video and, in response, the editing application can determine a target frame rate such that, when the summarized video is played back, skips in the playback are timed to coincide with beats in the song. For example, frames can be selected for removal such that there is a skip in the video that coincides with the beats of the song. In a more particular example, if a song has a tempo of 120 beats per minute (or two beats per second), the editing application can then remove frames such that the edited video appears to skip twice per second in time with the song (or some integer multiple of the beats per second of the song, or the like). This can be accomplished by, for example, removing every tenth frame from a 30 FPS video, removing every fifth frame, keeping eight frames and removing two frames in each sequence of ten frames, etc.

In some embodiments, the editing application can suggest one or more audio files (e.g., songs) to be used as a soundtrack or as a background for an edited video based on the frame rate of the edited video and/or a portion of the edited video. For example, a song can be recommended based on the beats per minute of the song and the frames that were removed from the received video (e.g., the frame rate of the edited video).

Referring back to FIG. 1, if the editing application determines that the user has not requested a change to the frame rate for at least a portion of the video file ("NO" at 104) or after the edited video has been generated at 108, process 100 can proceed to 110.

At 110, the editing application can receive any additional editing instructions from a user. For example, a user can remove portions of the edited video (e.g., edit out sequences of frames), add effects to certain frames by using filters (e.g., to add blur, enhance edges, apply an antique look to the frames), add annotations, add a soundtrack, etc. It should be noted that such filters can be applied to all frames of the edited video, individual frames, and/or groups of frames. For example, in some embodiments, a user can insert bookmarks or the like on frames to apply certain effects to, and/or can insert bookends on frames to denote a group of frames between the bookends to apply effects to. As another example, a zoom in operation can be applied to a particular area and/or particular subject in individual frames or groups of frames such that when the edited video is played back it appears that the user performed a zoom operation while capturing the received video. As yet another example, a user can apply transitions between certain frames, such as a wipe transition, a fade transition, etc.

In some embodiments, if a portion of a received video has been edited to apply summarization techniques described herein, effects can be applied to those portions that have been summarized and/or portions that have not been summarized selectively.

In some embodiments, the editing application can reduce the frame rate of a received video at 106 and 108 to assist a user in more efficiently identifying portions of a video that may be interesting. For example, if a user captured fifteen hours of video on a recent vacation, the user may be hesitant to edit the video to create a video to share with friends and family, as the user may perceive the task of finding interesting portions of the video tedious. The editing application can receive the user's video and generate a summarized video by reducing the frame rate of the entire video and playing back the summarized video for the user. The user can then flag parts that may be interesting while viewing the summarized video and the flagged portions can be used as the basis for generating a second edited video that the user can then share with others. This second edited video can include summarized video (e.g., video with a frame rate that has been reduced from the frame rate of the received video), un-summarized video (e.g., video that plays back at a normal speed), or both, and can also include any other effects such as those described above.

At 112, the editing application can determine whether a user instruction has been received to save the changes made to the received video, or to cancel one or more of the changes. In some embodiments, the user can select any or all changes to cancel or save. For example, a user can choose to cancel a particular effect, such as a blurring effect, and choose to save the edited video at the new frame rate. As another example, the user can cancel all changes, and the editing application can undo all of the changes made to the uploaded video.

An instruction to save or cancel particular changes can be made using any suitable techniques. For example, a user can select an option to revert a most recent change. As another example, a user can exit a user interface associated with the editing application and can be queried as to whether the user would like to save the edited video or not save the edited video (e.g., cancel changes made since last saving the video). As yet another example, a user interface associated with the editing application can include user interface elements for saving an edited video or canceling particular changes or all changes. As still another example, if the edited video was created without user input (e.g., a user selected an option when the video was uploaded to apply certain changes, such as a reduction in the frame rate of the video), the changes can be automatically saved.

If the editing application receives an instruction to cancel one or more of the changes made to the unedited video ("CANCEL" at 112), the editing application can remove the cancelled changes and process 100 can return to 104 (or 110 if the changes to the frame rate were not cancelled). Otherwise, if the editing application receives an instruction to save the changes ("SAVE" at 112), process 100 can proceed to 114.

At 114, the editing application can cause the edited video, and in some cases the received video, to be stored. The edited video can be stored using any suitable techniques. For example, the edited video can be stored on a server associated with a video sharing and/or content hosting service. As another example, the edited video can be stored on a server associated with a user account of the user (e.g., cloud storage) or in local storage (e.g., a hard drive, a flash drive, optical storage, or any other suitable storage device). As yet another example, the edited video can be sent to an address (e.g., an email address, an IP address, etc.) associated with the user and/or specified by the user.

In some embodiments, both the edited video and the received video can be stored. For example, in the case of a video sharing service, the received video can be stored in association with the edited video and both videos can be made available to viewers. It should be noted that the edited video and the received video can be stored with the same privacy settings or different privacy settings. For example, the user can choose to share the edited video with the public (e.g., the edited video can be accessed by any viewer using the video sharing service), but only share the received video with a select group of viewers (e.g., viewers that the viewer is connected with on a social network, viewers that the user invites to watch the video, viewers that navigate to a particular URL, etc.). In another example, the user can choose to store the received video as an archive copy or the like, and not make the received video accessible to any viewers.

In some embodiments, the user can be prompted to choose whether to store the received video in association with the edited video. Additionally, the user can be prompted to choose a level of privacy to associate with the edited video, the received video, and/or both. In some embodiments, as described below in connection with FIG. 3, the received video can be stored and can be accessed by a viewer is being presented with the edited video.

At 116, a video serving application can cause the edited video to be presented in response to receiving a request to present the edited video. The edited video can be presented to a viewer in response to any suitable request. For example, a viewer can be presented with the edited video after selecting a link (e.g., a link on a web page, in another video, in an email, etc.). As another example, the video can be embedded in a web page or the like and the viewer can select to play the video.

Figure 3:
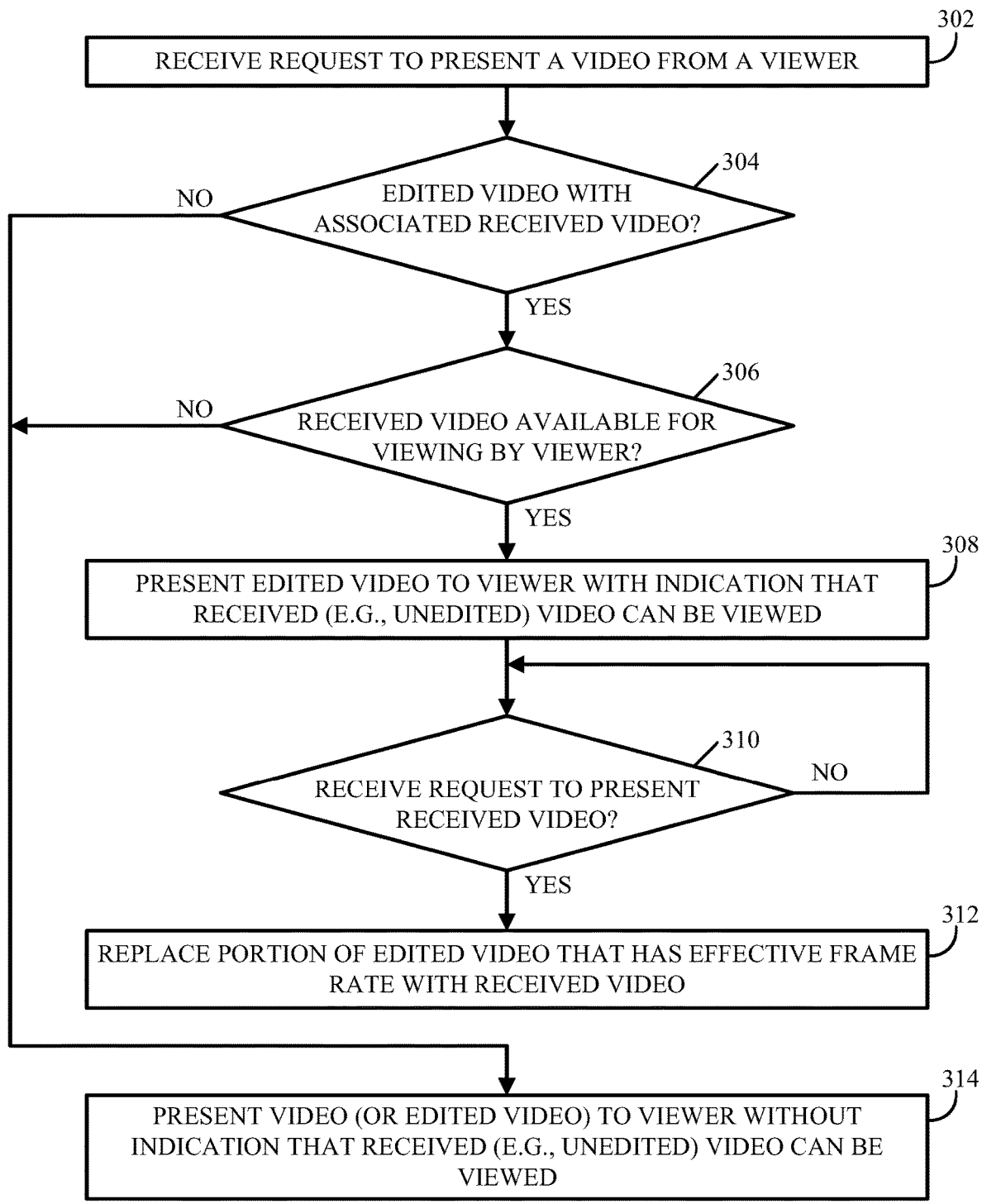
FIG. 3 shows an example of a process for presenting an edited video in accordance with some embodiments of the disclosed subject matter.

FIG. 3 shows an example 300 of a process for presenting the edited video to a viewer in accordance with some embodiments of the disclosed subject matter. At 302, a video presentation application associated with a video sharing service can receive a request to present a video and can determine whether a viewer requesting the video has permission to view the requested video. For example, if the requested video is public, the video can be available to all viewers. As another example, if the requested video is shared with only some viewers (e.g., is private), credentials such as a username and password, a relationship to the publisher of the video (e.g., the user that uploaded the video), etc., associated with the viewer can be verified. If the viewer is determined to have access to the video, the video presentation application can, at 304, determine whether the requested video is an edited video that has an associated received video.

If the requested video is an edited video with an associated received video ("YES" at 304), process 300 can proceed to 306. Otherwise, the requested video is not a requested video with an associated received video ("NO" at 304), process 300 can proceed to 314, described below.

At 306, the video presentation application can determine whether the user that uploaded and/or edited the video has made the received video available for viewing to viewers, such as the viewer that requested the video. For example, the user may have chosen different privacy settings for the edited video and the received video. In such an example, if the viewer that requested the video at 302 is an anonymous user, the viewer may be permitted to view the edited video but not the received video. This can allow the user to make an edited video available more widely than the received video, which may contain more private content and/or may not be edited and therefore the user may not be comfortable sharing the unedited received video.

If the received video is available for viewing by the viewer that requested the video at 302 ("YES" at 306), process 300 can proceed to 308. If the received video is not available for viewing by the viewer that requested the video at 302 ("NO" at 306), process 300 can proceed to 314, described below.

At 308, the video presentation application can cause the edited video to be presented to the viewer that requested the video at 302 with an indication that the unedited video can be viewed by the viewer. In some embodiments, the edited video can be presented with an indication, such as a link, an icon, or the like, that serves as an indication that an unedited version of the video is available for presentation to the viewer, and such an indication can also be selected by the viewer to cause the received video to be presented. Additionally or alternatively, a title, an identification number, a uniform resource locator (URL), a storage location, text, or any other information can be presented with the edited video as an indication that there is an unedited video associated with the edited video that is being presented to the viewer.

At 310, the video presentation application can determine whether a request has been received to present the received video. If a request has been received ("YES" at 310), process 300 can proceed to 312. Otherwise, if a request has not been received ("NO" at 310), process 300 can return to 310 and continue to monitor for a user request to present the received video. Additionally, if presentation of the edited video has ended, process 300 can be ended.

At 312, the video presentation application can cause at least a portion of the unedited video to be presented to the viewer. In some embodiments, a portion of the received video can be presented in place of the portion of the edited video that was playing when the request was received at 310 to present the received video. For example, when the viewer requests that the received video be presented, the video presentation application can cause the received video to be presented starting at a frame of the received video that corresponds to a frame of the edited video that was being presented.

In some embodiments, the video presentation application can cause a portion of the received video that corresponds to a currently presented portion of the edited video to be loaded (e.g., buffered) on a device that is rendering and playing back the edited video. In such embodiments, an application rendering the edited video may be able to seamlessly switch to presenting the received video from rendering the edited video.

Additionally or alternatively, requesting that the received video be presented can cause the entire received video to be loaded by a device rendering the edited video (or any other suitable device specified by the viewer). For example, the received video can be opened in another window or tab of a browser, rather than replacing the edited video. As another example, a browser window or application that was being used to render the edited video can be used to begin rendering the received video (e.g., the unedited video) from a beginning of the unedited video.

In some embodiments, the viewer can switch back and forth between the edited video and the received video at different points in the video. Returning to the example of the graduation video described above, if the viewer is the father of the user (e.g., the grandfather of the daughter in the example), he may wish to see portions of the graduation ceremony that the user previously determined were uninteresting. Recall that the user caused these portions to be summarized, and consequently these portions are presented in the edited video at a faster playback speed due to the reduced frame rate of those portions. In such an example, the grandfather can select a user interface item (e.g., an icon, a button, a link, etc.) and the received video can be presented in response to the selection of the user interface item. However, if the grandfather loses interest in the unedited video, he can select the user interface item again (or select any other suitable user interface item) to switch back to the summarized video. This can, for example, allow for a more interesting summarized version to be presented to most viewers, while allowing viewers interested in the unedited version of the summarized portions to indulge in their interest in watching the unedited version.

At 314, if the video requested at 302 is not an edited video associated with a received video ("NO" at 304) or the received unedited video is not available to the viewer ("NO" at 306), the video presentation application can cause the video requested at 302 to be presented to the viewer without an indication that the unedited video can be viewed. For example, the video can be presented as any other video that does not have an associated unedited version is presented.

Figure 4:
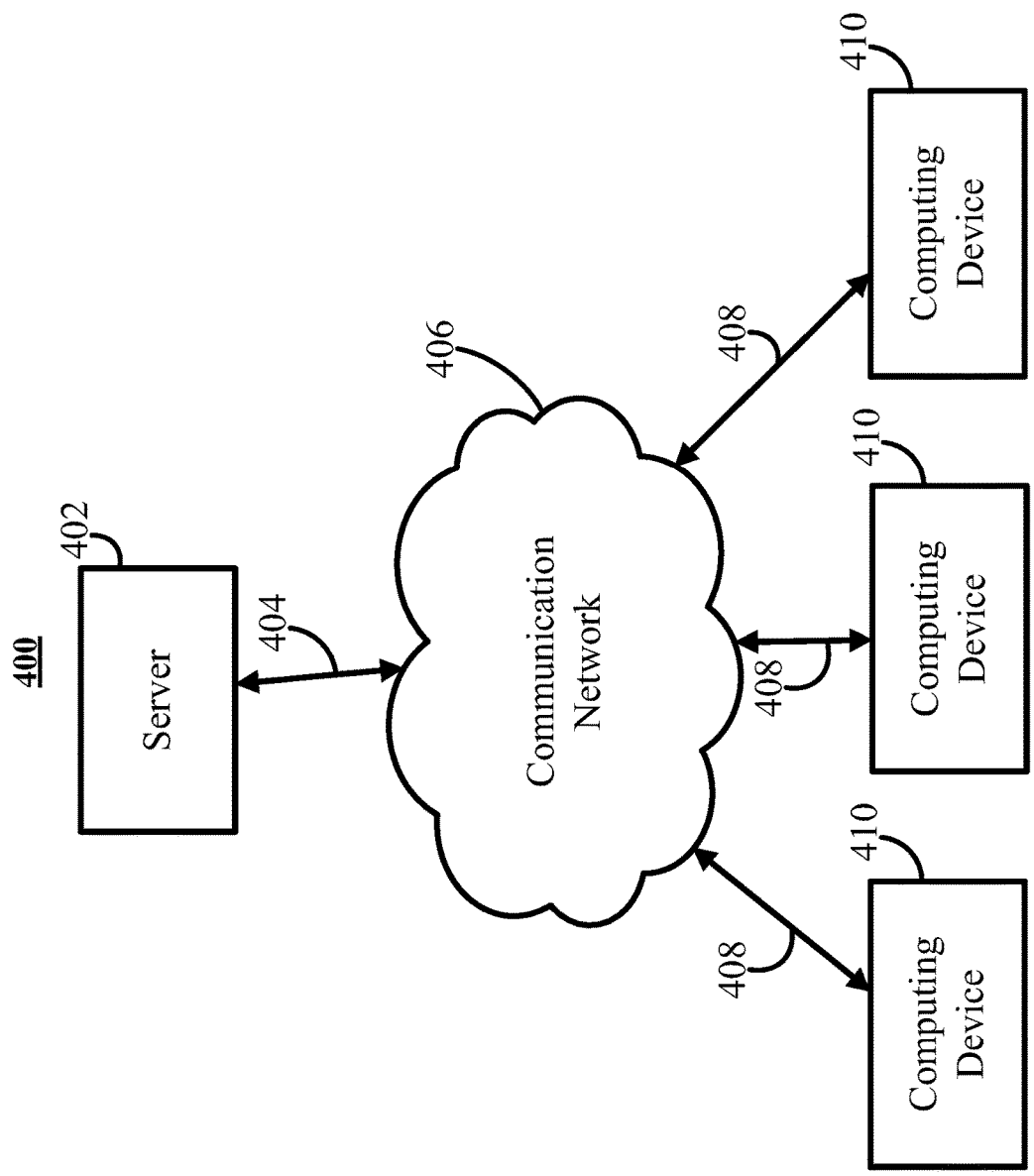
FIG. 4 shows a schematic diagram of an illustrative system suitable for implementation of the mechanisms described herein for editing a frame rate of a received video file in accordance with some embodiments of the disclosed subject matter.

FIG. 4 shows an example 400 of a generalized schematic diagram of a system on which the mechanisms for editing a frame rate of a received video as described herein can be implemented in accordance with some embodiments. As illustrated, system 400 can include one or more computing devices 410. Computing devices 410 can be local to each other or remote from each other. Computing devices 410 can be connected by one or more communications links 408 to a communications network 406 that can be linked via a communications link 404 to server 402.

System 400 can include one or more servers 402. Server 402 can be any suitable server for providing access to the mechanisms described herein for editing a frame rate of a received video file and/or presenting an edited video, such as a processor, a computer, a data processing device, or any suitable combination of such devices. For example, the mechanisms for editing a frame rate of a received video and/or presenting an edited video can be distributed into multiple backend components and multiple frontend components and/or interfaces. In a more particular example, backend components, such as data collection, data distribution and video editing can be performed on one or more servers 402. In another particular example, frontend components, such as a user interface, data entry, video rendering, etc., can be performed on one or more computing devices 410.

In some embodiments, each of the computing devices 410 and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 410 can be implemented as a smartphone having a camera, a tablet computer having a camera, a wearable computer having a camera, a camera device that interfaces with a smartphone (e.g., a camera dongle for a smartphone), a digital camera (e.g., a point and shoot camera, a DSLR camera, a digital camcorder, etc.), an analog camcorder, a personal computer, a laptop computer, a smartphone, a tablet computer, a gaming device, a digital media receiver, a set-top box, a smart television, a server, etc.

Communications network 406 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404 and 408 can be any communications links suitable for communicating data among computing devices 410 and server 402, such as network links, dial-up links, wireless links, hardwired links, any other suitable communications links, or any suitable combination of such links. Computing devices 410 can upload video to server 402 and the video can be edited using the editing application. Additionally or alternatively, computing devices 410 can execute the editing application to edit a video. Computing device 410 can also be used to present videos from server 402 or from any other suitable source (e.g., a hard drive, cloud storage, a flash drive, etc.) to a viewer (e.g., using a video presentation application and/or using an application for rendering videos). Computing devices 410 and server 402 can be located at any suitable location.

Figure 5:
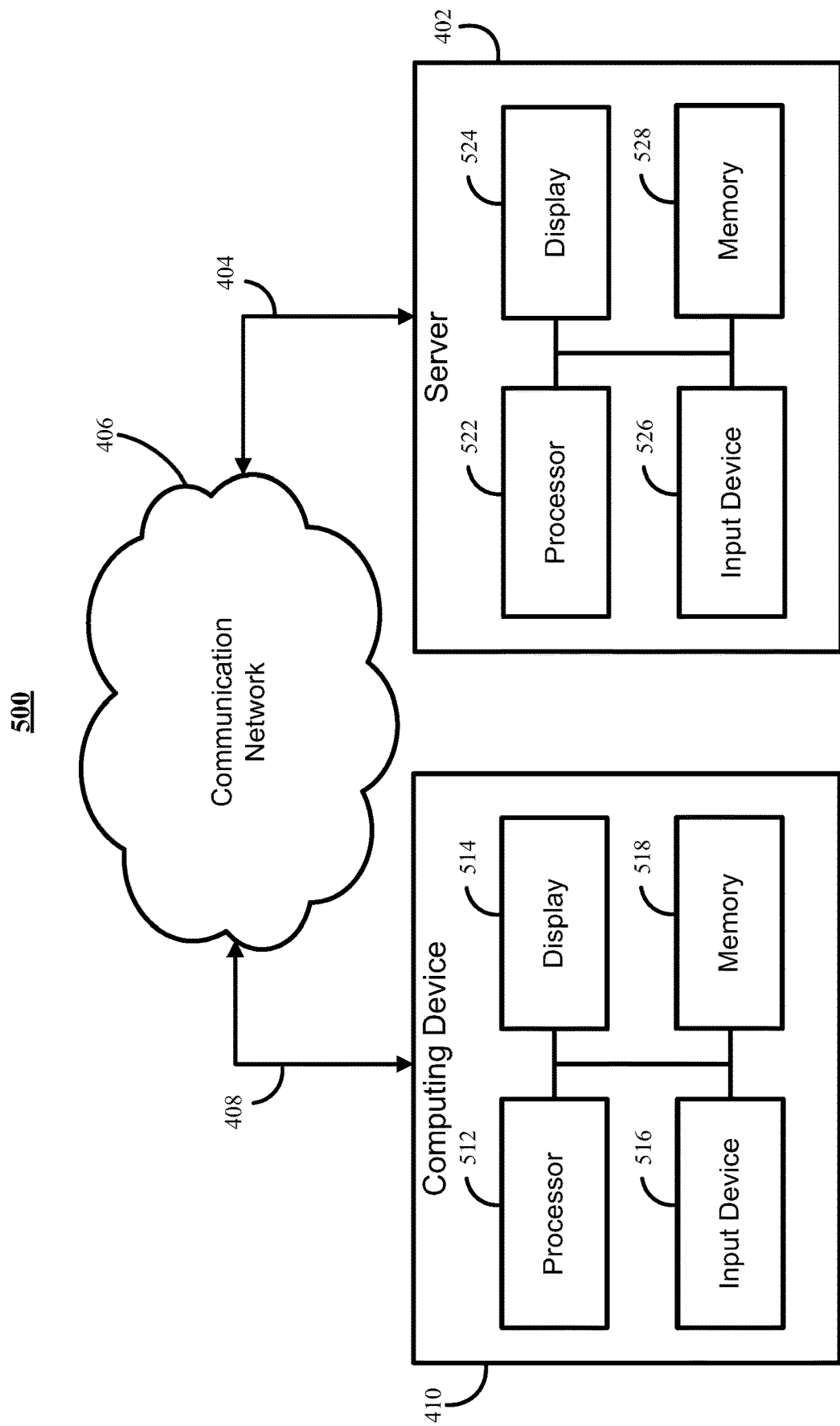
FIG. 5 shows a detailed example of a server and one of the computing devices of FIG. 4 that can be used in accordance with some embodiments of the disclosed subject matter.

FIG. 5 illustrates an example 500 of hardware that can be used to implement server 402 and one of computing devices 410 depicted in FIG. 4 in accordance with some embodiments of the disclosed subject matter. Referring to FIG. 5, computing device 410 can include a hardware processor 512, a display 514, an input device 516, and memory 518, which can be interconnected. In some embodiments, memory 518 can include a storage device (such as a non-transitive computer-readable medium) for storing a computer program for controlling hardware processor 512.

Hardware processor 512 can use the computer program to present on display 514 content and/or an interface that allows a user to, among other things, cause a video to be uploaded to server 402, interact with the video editing application, interact with the video presentation application, interact with the mechanisms described herein for editing a frame rate of a video being executed by a device, such as server 402, and to send and receive data through communications link 408. It should also be noted that data received through communications link 408 or any other communications links can be received from any suitable source. In some embodiments, hardware processor 512 can send and receive data through communications link 408 or any other communication links using, for example, a transmitter, receiver, transmitter/receiver, transceiver, or any other suitable communication device. Display 514 can be a flat panel display, a cathode ray tube display, a projector, a touch screen, a speaker(s), and/or any other suitable display and/or presentation devices. Input device 516 can be a computer keyboard, a computer mouse, a microphone, a touchpad, a voice recognition circuit, a touchscreen, and/or any other suitable input device.

Server 402 can include a hardware processor 522, a display 524, an input device 526, and memory 528, which can be interconnected. In some embodiments, memory 528 can include a storage device for storing data received through communications link 404 or through other links. The storage device can further include a server program for controlling hardware processor 522.

Hardware processor 522 can use the server program to communicate with image capture devices 410 and computing devices 412, as well as provide access to and/or copies of the editing application and/or the video presentation application. It should also be noted that data received through communications link 404 or any other communications links can be received from any suitable source. In some embodiments, hardware processor 522 can send and receive data through communications link 404 or any other communication links using, for example, a transmitter, receiver, transmitter/receiver, transceiver, or any other suitable communication device. In some embodiments, hardware processor 522 can receive commands and/or values transmitted by one or more users. Display 524 can be a flat panel display, a cathode ray tube display, a projector, a touch screen, a speaker(s), and/or any other suitable display and/or presentation devices. Input device 526 can be a computer keyboard, a computer mouse, a microphone, a touchpad, a voice recognition circuit, a touchscreen, and/or any other suitable input device.

In some embodiments, server 402 can be implemented in one server or can be distributed as any suitable number of servers. For example, multiple servers 402 can be implemented in various locations to increase reliability and/or increase the speed at which the server can communicate with computing devices 410. As another example, multiple servers 402 can be implemented for performing various tasks, such as one server (or set of servers) can receive videos (e.g., video files) and provide access to the editing application, another server (or set of servers) store edited and/or received videos, and yet another server (or set of servers) can provide access to the video presentation application and cause videos to be presented to viewers in response to a request to present a video.

In one particular embodiment, the editing application and/or the video presentation application can include server-side software, server-side hardware, client-side software, client-side hardware, or any suitable combination thereof. For example, the editing application and/or the video presentation application can encompass a computer program written in a programming language recognizable by server 402 executing the editing application (e.g., a program written in a programming language, such as, Java, C, Objective-C, C++, C #, Javascript, Visual Basic, or any other suitable approaches). As another example, the editing application and/or the video presentation application can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media generating a summarized video using frame rate modification are provided.

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 3 can be executed or performed in any order or sequence not limited to the order and sequence shown and described in the figures. Also, some of the above steps of the processes of FIGS. 1 and 3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for editing a video, the method comprising:
receiving, using a hardware processor, a video file having a playback frame rate from a first device;
receiving, from the first device, an input that indicates a level of summarization to be applied to the video file to generate a modified video file;
determining, using the hardware processor, a first target rate for a first portion of the video file based on an amount of change in the first portion of the video file and the level of summarization and determining a second target rate for a second portion of the video file based on an amount of change in the second portion of the video file and the level of summarization; and
generating, using the hardware processor, a first portion and a second portion of the modified video file, wherein:
the first portion of the video file includes a plurality of frames;
the modified video file includes a first subset of the plurality of frames and does not include a second subset of the plurality of frames, wherein the frames in the first subset of the plurality of frames are separated from each other by a predetermined number of frames in the plurality of frames and wherein the first subset has an effective frame rate that is at the first target rate; and
the effective frame rate of the second portion of the modified video file is at the second target rate.

2. The method of claim 1, further comprising identifying a plurality of frames from the first portion of the video file.

3. The method of claim 1, further comprising:
receiving a request from a second device for the modified video file; and
in response to the request for the modified video file, causing each of the first portion and the second portion of the modified video file to be presented by the second device at the playback frame rate of the modified video file.

4. The method of claim 3, wherein the frames from the first subset are presented more rapidly than the first target rate.

5. The method of claim 1, further comprising storing the received video file, wherein the modified video file is associated with the received video file.

6. The method of claim 1, further comprising:
receiving a request for the received video file while presenting a portion of the modified video file that corresponds to the first subset of the plurality of frames; and
in response to the request for the received video file, causing a portion of the received video file to be presented, wherein the portion of the received video file corresponds to the portion of the edited video file that was being presented when the request was received.

7. The method of claim 1, further comprising:
identifying an acceptable file size for the received video file;
determining whether a size of the received video file exceeds the acceptable file size; and
prompting a user to generate the modified video file using the first target rate for the first portion of the video file and the second target rate for the second portion of the video file in response to determining that the size of the received video file exceeds the acceptable file size.

8. A system for editing a video, the system comprising:
memory; and
a hardware processor that is coupled to the memory and that is configured to:
receive a video file having a playback frame rate from a first device;
receive, from the first device, an input that indicates a level of summarization to be applied to the video file to generate a modified video file;
determine a first target rate for a first portion of the video file based on an amount of change in the first portion of the video file and the level of summarization and determining a second target rate for a second portion of the video file based on an amount of change in the second portion of the video file and the level of summarization; and
generate a first portion and a second portion of the modified video file, wherein:
the first portion of the video file includes a plurality of frames;
the modified video file includes a first subset of the plurality of frames and does not include a second subset of the plurality of frames, wherein the frames in the first subset of the plurality of frames are separated from each other by a predetermined number of frames in the plurality of frames and wherein the first subset has an effective frame rate that is at the first target rate; and
the effective frame rate of the second portion of the modified video file is at the second target rate.

9. The system of claim 8, wherein the hardware processor is further configured to identify a plurality of frames from the first portion of the video file.

10. The system of claim 8, wherein the hardware processor is further configured to:
receive a request from a second device for the modified video file; and
in response to the request for the modified video file, cause each of the first portion and the second portion of the modified video file to be presented by the second device at the playback frame rate of the modified video file.

11. The system of claim 10, wherein the frames from the first subset are presented more rapidly than the first target rate.

12. The system of claim 8, wherein the hardware processor is further configured to store the received video file, wherein the modified video file is associated with the received video file.

13. The system of claim 8, wherein the hardware processor is further configured to:
receive a request for the received video file while presenting a portion of the modified video file that corresponds to the first subset of the plurality of frames; and
in response to the request for the received video file, cause a portion of the received video file to be presented, wherein the portion of the received video file corresponds to the portion of the edited video file that was being presented when the request was received.

14. The system of claim 8, wherein the hardware processor is further configured to:
identify an acceptable file size for the received video file;
determine whether a size of the received video file exceeds the acceptable file size; and
prompt a user to generate the modified video file using the first target rate for the first portion of the video file and the second target rate for the second portion of the video file in response to determining that the size of the received video file exceeds the acceptable file size.

15. A non-transitory computer-readable medium containing computer executable instructions that, when executed by a processor, cause the processor to perform a method for editing a video, the method comprising:
receiving, using a hardware processor, a video file having a playback frame rate from a first device;
receiving, from the first device, an input that indicates a level of summarization to be applied to the video file to generate a modified video file;
determining a first target rate for a first portion of the video file based on an amount of change in the first portion of the video file and the level of summarization and determining a second target rate for a second portion of the video file based on an amount of change in the second portion of the video file and the level of summarization; and
generating a first portion and a second portion of the modified video file, wherein:
the first portion of the video file includes a plurality of frames;
the modified video file includes a first subset of the plurality of frames and does not include a second subset of the plurality of frames, wherein the frames in the first subset of the plurality of frames are separated from each other by a predetermined number of frames in the plurality of frames and wherein the first subset has an effective frame rate that is at the first target rate; and
the effective frame rate of the second portion of the modified video file is at the second target rate.

16. The non-transitory computer-readable medium of claim 15, wherein the method further comprises identifying a plurality of frames from the first portion of the video file.

17. The non-transitory computer-readable medium of claim 15, wherein the method further comprises:
receiving a request from a second device for the modified video file; and
in response to the request for the modified video file, causing each of the first portion and the second portion of the modified video file to be presented by the second device at the playback frame rate of the modified video file.

18. The non-transitory computer-readable medium of claim 17, wherein the frames from the first subset are presented more rapidly than the first target rate.

19. The non-transitory computer-readable medium of claim 15, wherein the method further comprises storing the received video file, wherein the modified video file is associated with the received video file.

20. The non-transitory computer-readable medium of claim 15, wherein the method further comprises:
receiving a request for the received video file while presenting a portion of the modified video file that corresponds to the first subset of the plurality of frames; and in response to the request for the received video file, causing a portion of the received video file to be presented, wherein the portion of the received video file corresponds to the portion of the edited video file that was being presented when the request was received.

21. The non-transitory computer-readable medium of claim 15, wherein the method further comprises:
identifying an acceptable file size for the received video file;
determining whether a size of the received video file exceeds the acceptable file size; and
prompting a user to generate the modified video file using the first target rate for the first portion of the video file and the second target rate for the second portion of the video file in response to determining that the size of the received video file exceeds the acceptable file size.

* * * * *